US010696285B2

(12) United States Patent
Yasui et al.

(10) Patent No.: US 10,696,285 B2
(45) Date of Patent: Jun. 30, 2020

(54) ELECTRIC BRAKING DEVICE FOR VEHICLE

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Yoshiyuki Yasui, Nagoya (JP); Naoki Yabusaki, Toyota (JP)

(73) Assignees: ADVICS CO., LTD, Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 15/773,699

(22) PCT Filed: Nov. 25, 2016

(86) PCT No.: PCT/JP2016/085070
§ 371 (c)(1),
(2) Date: May 4, 2018

(87) PCT Pub. No.: WO2017/094630
PCT Pub. Date: Jun. 8, 2017

(65) Prior Publication Data

US 2018/0319384 A1 Nov. 8, 2018

(30) Foreign Application Priority Data

Nov. 30, 2015 (JP) ................................ 2015-233538

(51) Int. Cl.
*B60T 13/74* (2006.01)
*B60T 8/175* (2006.01)
(Continued)

(52) U.S. Cl.
CPC .............. *B60T 13/748* (2013.01); *B60T 8/17* (2013.01); *B60T 8/175* (2013.01); *B60T 8/1761* (2013.01);
(Continued)

(58) Field of Classification Search
CPC ...... B60T 13/74; B60T 13/741; B60T 13/745; B60T 8/175; B60T 8/17613
See application file for complete search history.

(56) References Cited

U.S. PATENT DOCUMENTS

| | | | | |
|---|---|---|---|---|
| 2008/0283325 A1* | 11/2008 | Kodama ............ | B60G 17/0164 180/243 |
| 2009/0055068 A1* | 2/2009 | Osaki .................... | B60K 28/16 701/87 |

(Continued)

FOREIGN PATENT DOCUMENTS

| | | |
|---|---|---|
| JP | 2001-130396 A | 5/2001 |
| JP | 2003-137081 A | 5/2003 |
| JP | 2015-30314 A | 2/2015 |

OTHER PUBLICATIONS

International Search Report (PCT/ISA/210) dated Feb. 7, 2017, by the Japan Patent Office as the International Searching Authority, for International Application No. PCT/JP2016/085070.

(Continued)

*Primary Examiner* — Vishal R Sahni
(74) *Attorney, Agent, or Firm* — Buchanan, Ingersoll & Rooney PC

(57) ABSTRACT

This electric braking device for a vehicle imparts to the wheels of the vehicle a braking torque in accordance with the output of an electric motor. A vehicle body-side electronic control unit calculates a command value for the output of the electric motor on the basis of the amount of operation performed on a braking operation member. A wheel-side electronic control unit adjusts the output of the electric
(Continued)

motor on the basis of the command value. The vehicle body-side electronic control unit calculates the vehicle body speed on the basis of the wheel speed. The wheel-side electronic control unit adjusts the output of the electric motor so as to prevent an increase in slippage of the wheels on the basis of the vehicle body speed and the wheel speed.

5 Claims, 6 Drawing Sheets

(51) Int. Cl.
*B60T 8/1761* (2006.01)
*B60T 8/17* (2006.01)

(52) U.S. Cl.
CPC .......... *B60T 8/17616* (2013.01); *B60T 13/74* (2013.01); *B60T 13/741* (2013.01); *B60T 8/17613* (2013.01); *B60T 13/745* (2013.01); *B60T 2250/04* (2013.01); *B60T 2260/06* (2013.01)

(56) References Cited

U.S. PATENT DOCUMENTS

| | | | | |
|---|---|---|---|---|
| 2015/0081186 | A1* | 3/2015 | Yasui | B60T 8/173 701/70 |
| 2016/0221446 | A1* | 8/2016 | Suzuki | B60L 15/20 |

OTHER PUBLICATIONS

Written Opinion (PCT/ISA/237) dated Feb. 7, 2017, by the Japan Patent Office as the International Searching Authority for International Application No. PCT/JP2016/085070.

International Preliminary Report on Patentability (Form PCT/IB/373) and the Written Opinion of the International Searching Authority (From PCT/ISA/237) dated Jun. 5, 2018, by the International Bureau of WIPO in corresponding International Application No. PCT/JP2016/085070. (6 pages).

* cited by examiner

Fig.4A
Fig.4B
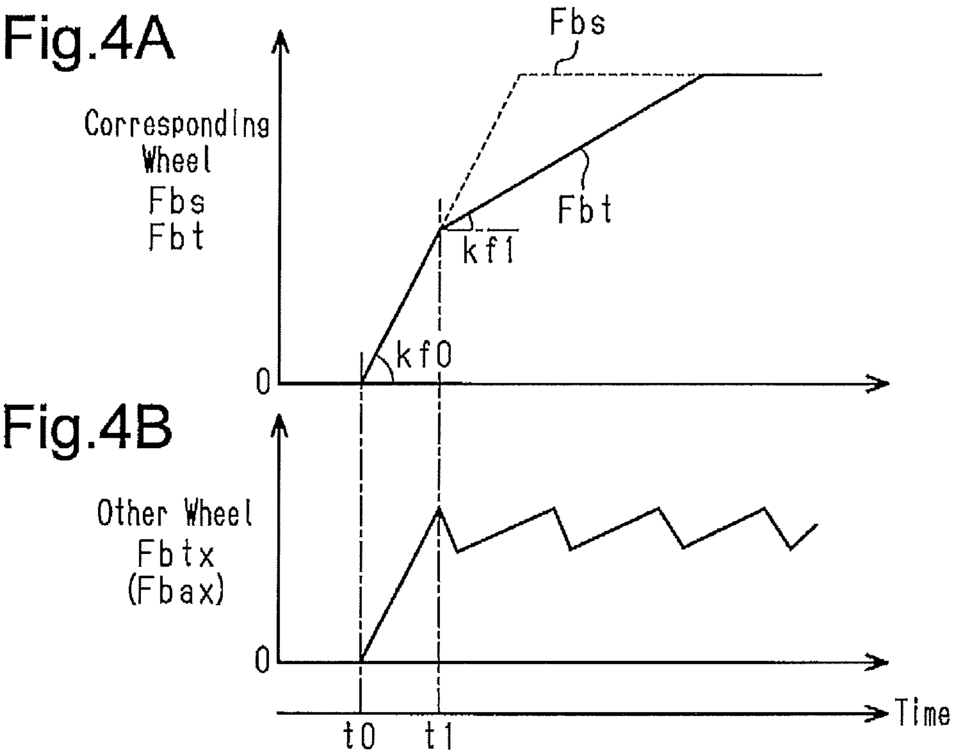
Fig.5A
Fig.5B
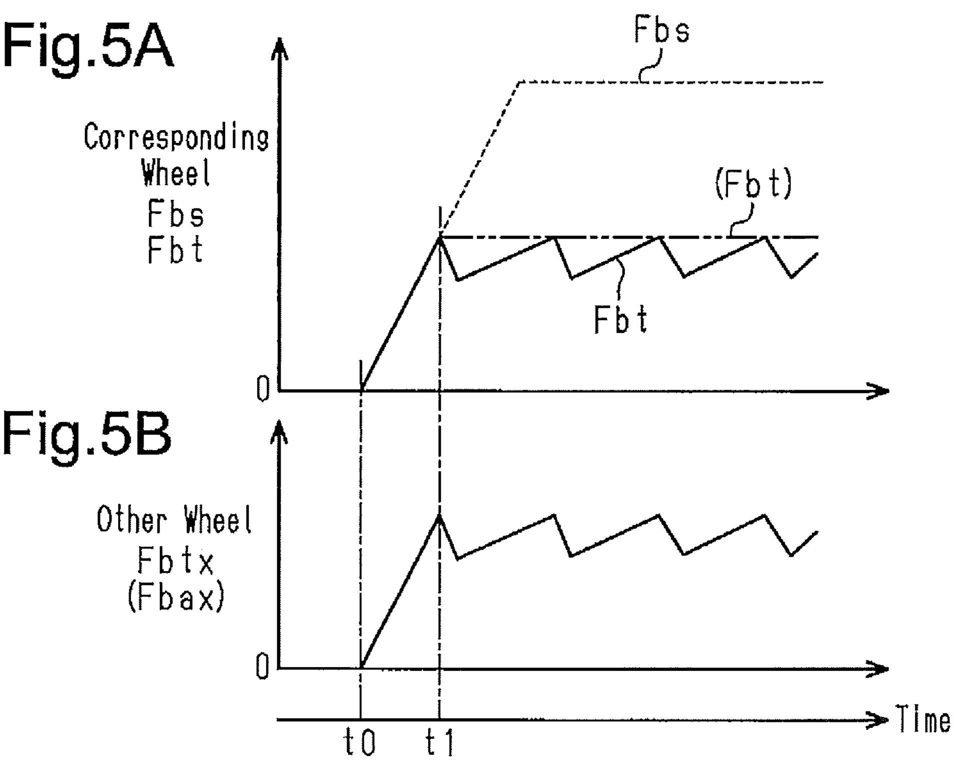

ELECTRIC BRAKING DEVICE FOR VEHICLE

TECHNICAL FIELD

The present invention relates to a vehicle electric braking device.

BACKGROUND ART

Patent document 1 describes "a drive controller (wheel electronic control unit) mounted on an actuator and performing communication through bidirectional multiplex communication with a vehicle motion controller (body electronic control unit) set on the body of a vehicle for the purpose of reducing the costs of bent cables and providing an inexpensive brake device." The document also describes that "a wheel speed sensor that detects the rotation speed of a wheel is electrically connected to the drive controller to reduce the number of bent cables in order to provide an inexpensive brake device. Further, the drive controller uses information of the wheel speed sensor to control the actuator with higher accuracy." However, there is no specific description of the control contents.

PRIOR ART DOCUMENT

Patent Document

Patent Document 1: Japanese Laid-Open Patent Publication No. 2003-137081

SUMMARY OF THE INVENTION

Problems that are to be Solved by the Invention

It is an object of the present invention to provide an electric braking device for a vehicle that properly performs control for restricting wheel slip in a device that performs bidirectional multiplex communication through a communication line between a body electronic control unit and a wheel electronic control unit

Means for Solving the Problem

To achieve the above object, a vehicle electric braking device according to one embodiment of the present invention applies braking torque to a wheel of a vehicle in accordance with an output of an electric motor (MTR) when a driver of the vehicle operates a brake operation member (BP). The vehicle electric braking device includes a body electronic control unit (ECB), a wheel electronic control unit (ECW), a communication line (SGL), a wheel speed sensor (VWA), and a body speed computer (VXA). The body electronic control unit (ECB) is arranged on a body of the vehicle and configured to calculate an instruction value (Fbs) of the output of the electric motor (MTR) based on an operation amount (Bpa) of the brake operation member (BP). The wheel electronic control unit (ECW) is arranged proximate to the wheel of the vehicle and configured to adjust the output of the electric motor (MTR) based on the instruction value (Fbs). The communication line (SGL) is connected to both of the body electronic control unit (ECB) and the wheel electronic control unit (ECW) to perform signal transmission between the body electronic control unit (ECB) and the wheel electronic control unit (ECW). The wheel speed sensor (VWA) is connected to the wheel electronic control unit (ECW) to acquire a speed of the wheel as a wheel speed (Vwa).

Further, the body electronic control unit (ECB) is configured to calculate a body speed (Vxa) of the vehicle based on the wheel speed (Vwa) that is transmitted from the wheel electronic control unit (ECW) via the communication line (SGL). The wheel electronic control unit (ECW) is configured to adjust the output of the electric motor (MTR) so as to limit an increase in slip of the wheel based on the body speed (Vxa) transmitted from the body electronic control unit (ECB) via the communication line (SGL) and the wheel speed (Vwa) acquired by the wheel speed sensor (VWA).

The wheel speed (Vwa) of each of the wheels of a vehicle (four wheels in a typical automobile) is needed to calculate the body speed (Vxa) of the vehicle. In a hypothetical configuration in which the wheel speed (Vwa) of each wheel is sent (transmitted) to the body electronic control unit (ECB) and a control for limiting an increase in the wheel (referred to as "the wheel slip restriction control") is executed by the body electronic control unit (ECB), the wheel speed (Vwa) is sent (transmitted) from the wheel electronic control unit (ECW) to the body electronic control unit (ECB) in each communication cycle. The body electronic control unit (ECB) calculates the body speed (Vxa) based on the wheel speed (Vwa) of each wheel gathered at the body electronic control unit (ECB) and calculates the instruction value (Fbs) in each calculation cycle. When executing the wheel slip restriction control, the instruction value (Fbs) is calculated based on the calculated body speed (Vxa) and the wheel speed (Vwa), which is received from the wheel electronic control unit (ECW). The instruction value (Fbs) is sent (transmitted) to the wheel electronic control unit (ECW) in each communication cycle to adjust the output of the electric motor (MTR). The above hypothetical configuration produces a delay corresponding to a communication cycle needed for the wheel speed (Vwa) and the signal of the instruction value (Fbs) to go back and forth once between the body electronic control unit (ECB) and the wheel electronic control unit (ECW). This may increase wheel slip.

In the above vehicle electric braking device, the wheel speed (Vwa) is input to the wheel electronic control unit (ECW), which is arranged on the wheel, and sent (transmitted) via the communication line (SGL) to the body electronic control unit (ECB), which is arranged on the body, so that the body electronic control unit (ECB) calculates the body speed (Vxa). The body speed (Vxa) is sent (transmitted) via the communication line (SGL) from the body electronic control unit (ECB) to the wheel electronic control unit (ECW) so that the wheel electronic control unit (ECW) executes wheel slip restriction control based on the wheel speed (Vwa) and the body speed (Vxa).

As described above, when a data signal is transmitted and received via the communication line (SGL), such as a serial communication bus, the communication cycle affects the timing (delay) at which the signal is obtained. However, the inertia of the body (inertial mass) is relatively large. Thus, the body speed (Vxa) does not rapidly change and is hardly affected by the communication cycle. For this reason, the wheel speed (Vwa) of each wheel is gathered at the body electronic control unit (ECB), and the body electronic control unit (ECB) calculates the body speed (Vxa) and then transmits the body speed (Vxa) to the wheel electronic control unit (ECW) of each wheel. In contrast, the inertia of a wheel (moment of inertia) is relatively small and rapidly changes. Consequently, a delay in the communication cycle greatly affects the execution of the wheel slip restriction control. For this reason, during the execution of wheel slip restriction control, the wheel speed (Vwa) is directly input by the wheel speed sensor (VWA) to the wheel electronic control unit (ECW). As a result, in the above configuration, the wheel electronic control unit (ECW) executes wheel slip restriction control based on the wheel speed (Vwa) that is not affected by the communication cycle (no time delay).

Accordingly, wheel slip restriction control is properly executed in a device that performs bidirectional multiplex communication between the body electronic control unit (ECB) and the wheel electronic control unit (ECW) via the communication line (SGL).

Preferably, the wheel electronic control unit (ECW) is configured to correct the instruction value (Fbs) so as to decrease a deceleration slip of the wheel based on deviation (Sgs) of the body speed (Vxa) and the wheel speed (Vwa) and adjust the output of the electric motor (MTR) based on the corrected instruction value (Fbs). That is, the wheel electronic control unit (ECW) properly executes anti-skid control, which is one example of wheel slip restriction control, based on the wheel speed (Vwa) that has no time delay.

Preferably, the wheel electronic control unit (ECW) is configured to correct the instruction value (Fbs) so as to decrease an acceleration slip based on a deviation (Sks) of the body speed (Vxa) and the wheel speed (Vwa) and adjust the output of the electric motor (MTR) based on the corrected instruction value (Fbs). That is, the wheel electronic control unit (ECW) properly executes traction control, which is one example of wheel slip restriction control, based on the wheel speed (Vwa) that has no time delay.

A vehicle electric braking device according to a further embodiment of the present invention applies braking torque to a wheel of a vehicle in accordance with an output of an electric motor (MTR) when automatic braking is being performed while the vehicle is traveling. The vehicle electric braking device includes a body electronic control unit (ECB), a wheel electronic control unit (ECW), a communication line (SGL), and a wheel speed sensor (VWA). The body electronic control unit (ECB) is arranged on a body of the vehicle and configured to calculate an instruction value (Fbs) of the output of the electric motor (MTR) based on a distance from the vehicle to an obstacle located in front of the vehicle. The wheel electronic control unit (ECW) is arranged proximate to the wheel of the vehicle and configured to adjust the output of electric motor (MTR) based on the instruction value (Fbs). The communication line (SGL) is connected to both of the body electronic control unit (ECB) and the wheel electronic control unit (ECW) to perform signal transmission between the body electronic control unit (ECB) and the wheel electronic control unit (ECW). The wheel speed sensor (VWA) is connected to the wheel electronic control unit (ECW) to acquire a speed of the wheel as a wheel speed (Vwa). The body electronic control unit (ECB) is configured to calculate a body speed (Vxa) of the vehicle based on the wheel speed (Vwa) that is transmitted from the wheel electronic control unit (ECW) via the communication line (SGL). Further, the wheel electronic control unit (ECW) is configured to adjust the output of the electric motor (MTR) so as to limit an increase in slip of the wheel based on the body speed (Vxa) transmitted from the body electronic control unit (ECB) via the communication line (SGL) and the wheel speed (Vwa) acquired by the wheel speed sensor (VWA).

With the above configuration, even when automatic braking is performed while the vehicle is traveling, the wheel electronic control unit (ECW) executes wheel slip restriction control based on the body speed (Vxa) input via the communication line (SGL) and the wheel speed (Vwa) directly input by the wheel speed sensor (VWA). That is, the wheel electronic control unit (ECW) executes proper slip restriction control based on the wheel speed (Vwa) that has no time delay. Accordingly, wheel slip restriction control is properly executed in a device that performs bidirectional multiplex communication between the body electronic control unit (ECB) and the wheel electronic control unit (ECW) via the communication line (SGL).

BRIEF DESCRIPTION OF THE DRAWINGS

FIGS. 4A and 4B are chronological line charts used to illustrate limiting process calculation when performing anti-skid control on a front wheel in a pressing force correction computation block of an anti-skid control block.

FIGS. 5A and 5B are chronological line charts used to illustrate limiting process calculation when performing anti-skid control on a rear wheel in the pressing force correction computation block of the anti-skid control block.

EMBODIMENTS OF THE INVENTION

First Embodiment

A first embodiment of a vehicle electric braking device will now be described with the drawings.

Figure 1:
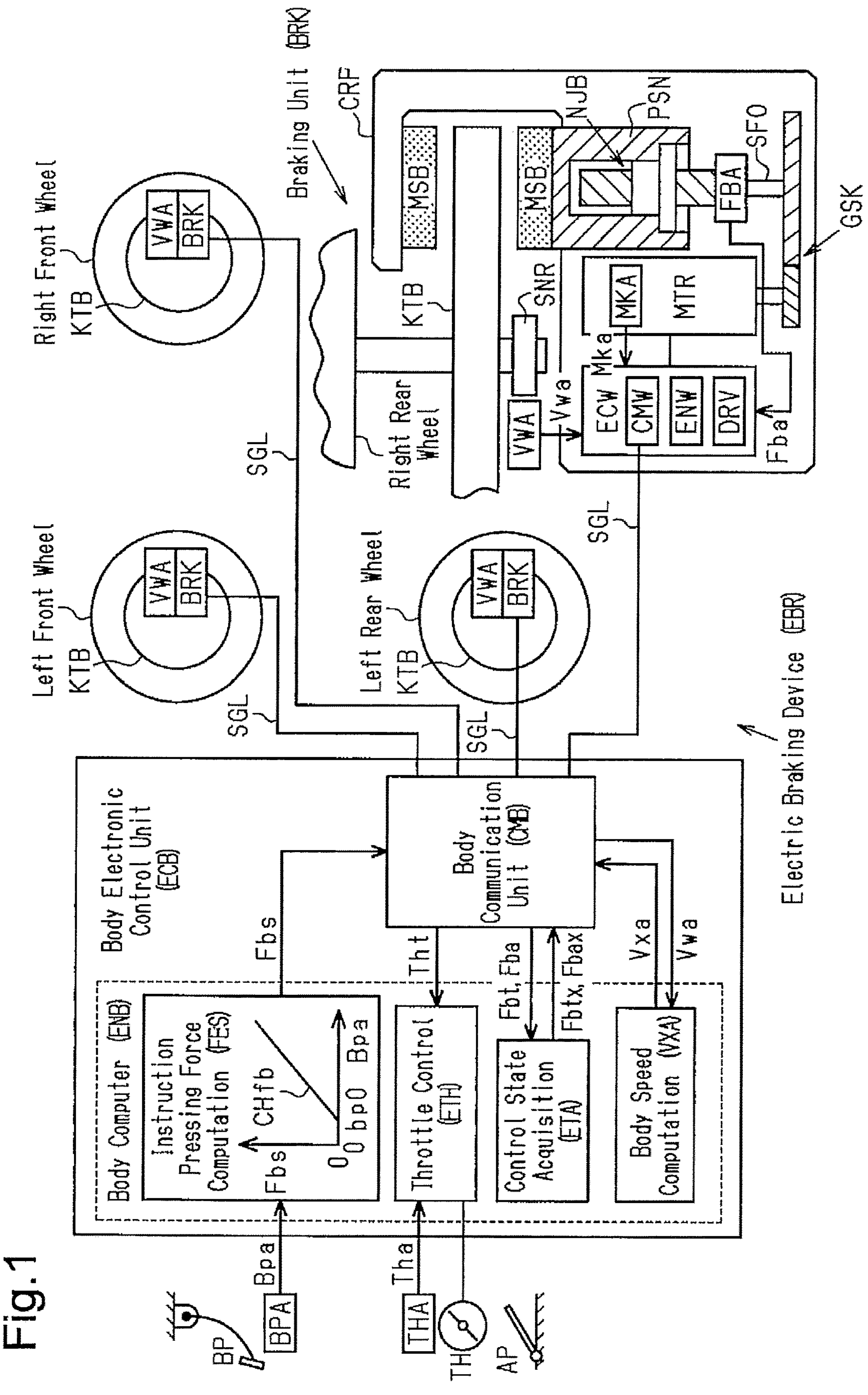
FIG. 1 is a diagram showing the entire configuration of a vehicle electric braking device in accordance with a first embodiment of the present invention.

Entire configuration of vehicle braking device in accordance with the first embodiment FIG. 1 is a diagram showing the entire configuration of an electric braking device EBR for a vehicle. A vehicle provided with the electric braking device EBR includes a brake operation member BP, a brake operation amount acquisition unit BPA, an acceleration operation member AP, a throttle actuator TH, a throttle open degree acquisition unit THA, a body electronic control unit ECB, a braking unit BRK, a wheel speed acquisition unit VWA, and a communication line SGL. The brake operation amount acquisition unit BPA, the body electronic control unit ECB, the braking unit BRK, and the communication line SGL are elements of the electric braking device EBR.

The brake operation member BP (e.g., brake pedal) is a member operated by a driver to reduce the speed of the vehicle and stop the vehicle. Operation of the brake operation member BP adjusts the braking torque of the wheel with the braking unit BRK. This generates a braking force on the wheel and reduces the speed of the traveling vehicle. The brake operation member BP includes the brake operation amount acquisition unit BPA. The brake operation amount acquisition unit BPA acquires (detects) an operation amount Bpa (brake operation amount) of the brake operation member BP produced by the driver.

At least one of a sensor that detects the pressure of a master cylinder (pressure sensor), a sensor that detects the operation force of the brake operation member BP (depression force sensor), and a sensor that detects the operation movement of the BP (stroke sensor) is employed as the brake operation amount acquisition unit BPA. Accordingly, an operation amount Bpa is calculated from at least one of a master cylinder pressure, a brake pedal depression force, and a brake pedal stroke. The acquired operation amount Bpa is input to the body electronic control unit ECB.

The acceleration operation member AP (e.g., acceleration pedal) is a member operated by the driver to accelerate the vehicle. The body electronic control unit ECB controls the throttle actuator TH in accordance with the operation amount of the acceleration operation member AP. More specifically, the throttle actuator TH adjusts the throttle open degree of the engine and adjusts the output of the engine. The throttle actuator TH includes a throttle open degree acquisition unit THA (throttle open degree sensor) that acquires a throttle open degree Tha. The throttle open degree Tha is a signal from the throttle open degree acquisition unit THA (throttle open degree sensor) and input to the body electronic control unit ECB.

Body Electronic Control Unit ECB

The body electronic control unit ECB is arranged on the body of the vehicle. The body electronic control unit ECB is provided with electric circuitry including a processor. The body electronic control unit ECB includes a body computer ENB and a body communication unit CMB.

The body computer ENB includes an instruction pressing force computation block FBS, a body speed computation block VXA, a throttle control block ETH, and a control state acquisition block ETA. The instruction pressing force computation block FBS, the body speed computation block VXA, the throttle control block ETH, and the control state acquisition block ETA are control algorithms and programmed in a processor of the body electronic control unit ECB.

The instruction pressing force computation block FBS calculates an instruction pressing force FBs (instruction value) from the operation amount Bpa. The instruction pressing force FBs is a target value for a force with which a friction member MSB (brake pad) presses a rotation member KTB (brake disc). The instruction pressing force FBs is calculated from the operation amount Bpa and a preset calculation map CHfb. More specifically, the instruction pressing force FBs is calculated from the calculation map CHfb having characteristics in which the instruction pressing force FBs increases from zero as the operation amount Bpa increases.

The body speed computation block VXA calculates a body speed Vxa of the vehicle through a known process from wheel speeds Vwa of the four vehicle wheels. For example, the highest wheel speed Vwa of the four wheels may be used as the body speed Vxa. The wheel speed Vwa is acquired (detected) by the wheel speed acquisition unit VWA of each wheel and input to a wheel electronic control unit ECW of the corresponding wheel. The wheel electronic control unit ECW then sends (transmits) the wheel speed Vwa to the body electronic control unit ECB. The wheel electronic control unit ECW is located proximate to the wheel. The phrase of "located proximate to the wheel" refers to a portion of the vehicle proximate to the wheel, preferably, in the braking unit BRK.

The body electronic control unit ECB and the wheel electronic control unit ECW are each implemented by, for example, circuitry, that is, one or more dedicated hardware circuits such as an ASIC, one or more processing circuits that run on a computer program (software), or a combination of these two. A processing circuit includes a CPU and a memory (ROM, RAM, etc.) storing programs executed by the CPU. The memory, or computer readable medium, includes any medium that is accessible and usable by a versatile or dedicated computer.

The throttle control block ETH controls the throttle actuator TH based on a target throttle open degree Tht. The throttle actuator TH controls the throttle open degree and adjusts the engine output. This adjusts the drive torque of the ones of the wheels serving as drive wheels. The target throttle open degree Tht is sent (transmitted) from the wheel electronic control unit ECW to the body electronic control unit ECB.

The control state acquisition block ETA acquires the wheel slip restriction control state of the four wheels at the front and rear left and right sides. In this case, "the wheel slip restriction control" includes anti-skid control (control for lowering locking tendency of wheel) and traction control (control for lowering spinning tendency of wheel). The wheel slip restriction control state is acquired as at least one of "whether or not the control has started," "whether or not the control has ended," "the target pressing force Fbt (target value corrected by slip restriction control)," and "the actual pressing force Fba." In this case, "the wheel slip restriction control state" is simply referred to as "the control state." The control state (Fbt, Fba, etc.) is transmitted via the communication line SGL (serial communication bus) from the wheel electronic control unit ECW to the body electronic control unit ECB.

Further, the control state acquisition block ETA outputs, among the acquired control states, the control state (Fbt, Fba, etc.) of another wheel via the communication line SGL to the wheel electronic control unit ECW. For example, the control state (Fbt, Fba, etc.) of the rear left wheel is sent (transmitted) as the control state (Fbtx, Fbax, etc.) of another wheel to the wheel electronic control unit ECW of the rear right wheel.

The instruction pressing force FBs, the body speed Vxa, and the control state (Fbtx, Fbax, etc.) calculated or acquired in each block is output to the body communication unit CMB. The body communication unit CMB is connected to the communication line SGL to exchange (transmit and receive) data signals with a wheel communication unit CMW of the wheel electronic control unit ECW. The body electronic control unit ECB has been described above.

Braking Unit BRK (Brake Actuator)

The braking unit BRK will now be described. The four wheels at the front and rear left and right sides are each provided with the braking unit BRK. The braking unit BRK applies braking torque to the corresponding wheel in accordance with the friction force generated by pushing the friction member MSB against the rotation member KTB that rotates integrally with the wheel. This generates braking force on the wheel and reduces the speed of the traveling vehicle.

The structure of a disc-type braking device (disc brake) is exemplified as the braking unit BRK. In this case, the friction member MSB is a brake pad, and the rotation member KTB is a brake disc. The braking unit BRK may alternatively be a drum-type braking device (drum brake). In the case of a drum brake, the friction member MSB is a brake shoe, and the rotation member KTB is a brake drum.

The braking unit BRK (brake actuator) includes a brake caliper CRP (also simply referred to as "the caliper"), a pressing member PSN, an electric motor MTR, a rotation angle acquisition unit MKA, a reduction gear GSK, an output member SFO, a threaded member NJB, a pressing force acquisition unit FBA, and a wheel electronic control unit ECW.

A floating caliper may be employed as the caliper CRP. The caliper CRP is formed by sandwiching the rotation member KTB (brake disc) between two friction members MSB (brake pads). Inside the caliper CRP, the pressing member PSN (brake piston) moves (forward or rearward) relative to the rotation member KTB.

The movement of the pressing member PSN presses the friction members MSB against the rotation member KTB to generate friction force. The pressing member PSN is moved by the power of the electric motor MTR. More specifically, the output of the electric motor MTR (rotation force about axis) is transmitted via the reduction gear GSK to the output member SFO. The rotation power (torque) of the output member SFO is converted by the threaded member NJB to linear power (thrust in axial direction of pressing member PSN) and transmitted to the pressing member PSN. As a result, the pressing member PSN is moved relative to the rotation member KTB. The movement of the pressing member PSN adjusts the force of the friction members MSB pressing the rotation member KTB (pressing force). The rotation member KTB is fixed to the wheel. Thus, the friction members MSB generate friction force with the rotation member KTB and adjust the braking torque on the wheel.

The electric motor MTR is a power source that drives (moves) the pressing member PSN. For example, a brush-incorporating motor or a brushless motor may be employed as the electric motor MTR. With regard to the rotation direction of the electric motor MTR, the forward rotation direction corresponds to the direction in which the friction members MSB move toward the rotation member KTB (direction in which pressing force increases and braking torque increases), and the reverse rotation direction corresponds to the direction in which the friction members MSB move away from the rotation member KTB (direction in which pressing force decreases and braking torque decreases).

The rotation angle acquisition unit MKA (e.g., rotation angle sensor) acquires (detects) a rotation angle Mka of a rotor (rotation element) of the electric motor MTR. The detected rotation angle Mka is input to the wheel electronic control unit ECW (more specifically, processor in wheel electronic control unit ECW).

The pressing force acquisition unit FBA (e.g., pressing force sensor) acquires (detects) the force of the pressing member PSN pressing the friction member MSB (pressing force Fba). The actually detected pressing force (actual pressing force Fba) is input to the wheel electronic control unit ECW (more specifically, processor in wheel electronic control unit ECW). For example, the pressing force acquisition unit FBA is located between the output member SFO and the caliper CRP.

The wheel electronic control unit ECW is electric circuitry that drives the electric motor MTR. The wheel electronic control unit ECW drives the electric motor MTR and controls the output of the electric motor MTR based on the instruction pressing force FBs. The instruction pressing force FBs is transmitted via the communication line SGL (also referred to as signal line) from the body electronic control unit ECB to the wheel electronic control unit ECW. The wheel electronic control unit ECW is arranged (fixed) inside the caliper CRP.

The wheel electronic control unit ECW includes the wheel communication unit CMW, a wheel computer ENW, and a drive unit DRV. The wheel communication unit CMW is connected to the communication line SGL to exchange (transmit and receive) data signals (Vwa, Fbs, Fbt, Fbtx, etc.) with the body communication unit CMB of the body electronic control unit ECB. The body communication unit CMB, the communication line SGL, and the wheel communication unit CMW are collectively referred to as "the communication unit TSN" (refer to FIG. 2).

Figure 2:
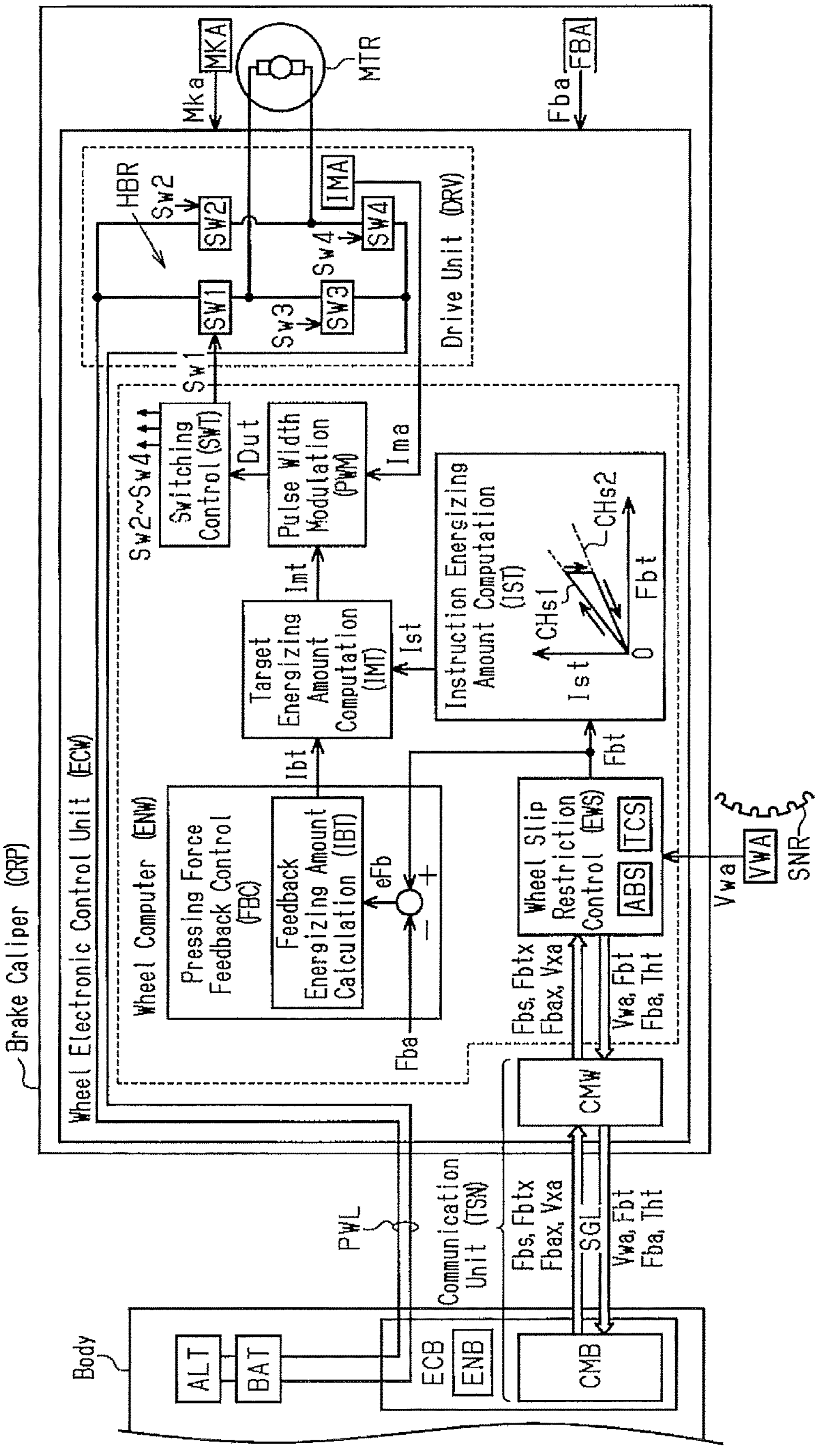
FIG. 2 is a schematic diagram illustrating a wheel electronic control unit of FIG. 1 in detail.

As shown in FIG. 2, the wheel computer ENW calculates drive signals Sw1 to Sw4 to control switching elements SW1 to SW4, which are used to drive the electric motor MTR, and switch the energizing state of the switching elements SW1 to SW4. The switching rotates and drives the electric motor MTR and adjusts the output of the electric motor MTR. The braking unit BRK has been described above.

As shown in FIGS. 1 and 2, the communication line SGL, which is connected to both of the body electronic control unit ECB and the wheel electronic control unit ECW, forms the communication unit TSN between the body electronic control unit ECB and the wheel electronic control unit EC. The transfer (transmission and reception) of data signals between the body electronic control unit ECB and the wheel electronic control unit ECW is performed with the single communication line SGL. A serial communication bus is employed as the communication line SGL. The serial communication bus is a bus that transmits data one bit at a time in series within a single communication path. For example, a CAN bus is employed as the serial communication bus.

The four wheels are each provided with the wheel speed acquisition unit VWA (wheel speed sensor). The wheel speed acquisition unit VWA acquires (detects) the rotation speed of the corresponding wheel as the wheel speed Vwa. The wheel speed acquisition unit VWA is electrically connected to the wheel electronic control unit ECW. The wheel speed Vwa, which is the detection signal of the wheel speed acquisition unit VWA, is directly input to the wheel electronic control unit ECW.

Wheel Electronic Control Unit ECW

With reference to FIGS. 1 and 2, the wheel electronic control unit ECW will now be described. The wheel electronic control unit ECW adjusts the energizing state of the electric motor MTR (consequently, amount and direction of current) and controls the output and the rotation direction of the electric motor MTR based on the instruction pressing force FBs received by the body electronic control unit ECB, the body speed Vxa, and the wheel speed Vwa acquired (detected) by the wheel speed acquisition unit VWA. The wheel electronic control unit ECW includes the wheel communication unit CMW, the wheel computer ENW, and the drive unit DRV.

Wheel Communication Unit CMW

The wheel communication unit CMW is part of the communication unit TSN and connected via the communication line SGL to the body communication unit CMB of the body electronic control unit ECB. A serial communication bus (e.g., CAN communication) is employed as the communication line SGL. The instruction pressing force FBs, the body speed Vxa, and the control state (Fbtx, Fbax, etc.) of another wheel are transmitted (transferred) via the communication unit TSN from the body electronic control unit ECB to the wheel electronic control unit ECW (in particular, from body communication unit CMB to wheel communication unit CMW). Further, the wheel speed Vwa of the corresponding wheel, the target pressing force Fbt, the actual pressing force Fba, and the target throttle open degree Tht are transmitted (transferred) via the communication unit TSN from the wheel electronic control unit ECW to the body electronic control unit ECB (more specifically, from wheel communication unit CMW to body communication unit CMB). The body communication unit CMB and the wheel communication unit CMW perform error detection on the received and transmitted data signal (Vwa etc.).

Wheel Computer ENW

The wheel computer ENW is a control algorithm and programmed in a processor of the wheel electronic control unit ECW. The wheel computer ENW includes a wheel slip restriction control block EWS, an instruction energizing amount computation block IST, a pressing force feedback control block FBC, a target energizing amount computation block IMT, a pulse width modulation block PWM, and a switching control block SWT.

The wheel slip restriction control block EW corrects (adjusts) the instruction pressing force FBs based on the wheel speed Vwa and the body speed Vxa so that the wheel slip does not become excessive and calculates the target pressing force Fbt (final target value). The body speed Vxa is calculated in the body electronic control unit ECB and transmitted via the communication unit TSN. The wheel speed Vwa from the wheel speed acquisition unit VWA provided on each wheel is directly input to the wheel slip restriction control block EWS. The wheel slip restriction control block EWS includes an anti-skid control block ABS that lowers the locking tendency (excessive deceleration slip) of the corresponding wheel and a traction control block TCS that lowers the spinning tendency (excessive acceleration slip) of the corresponding wheel. These blocks will be described in detail later.

The exchange of data signals (Vwa etc.) is routed through the communication unit TSN (i.e., single communication line SGL) and performed in predetermined communication cycles. Thus, a data signal routed through the communication unit TSN is delayed in time because of the communication cycle. The transmitted data signal includes a motor rotation angle (i.e., rotation angle Mka of rotor), a motor current Ima, and the like to monitor whether or not the braking unit BRK is properly functioning. Thus, the communication unit TSN, performs bidirectional transmission with a large number of data signals.

In the communication unit TSN (serial communication bus), a single group of signals is referred to as a "message" or a "data frame." That is, an aggregate of the data signals (Vwa etc.) corresponds to a message. There is a limit (e.g., maximum of 8 bytes) to the capacity of a message (particularly, data field in message). Thus, an increase in the types of signals will increase the number (type) of messages on the serial communication bus and prolong the cycle for obtaining a signal required to control the electric motor MTR. Further, when the body electronic control unit ECB and the wheel electronic control unit ECW are connected to another electronic control unit (e.g., steering system electronic control unit or drive system electronic control unit) thereby configuring an on-board network, the number of messages becomes enormous and the time delay of data signals becomes outstanding. Moreover, when the usage rate of the serial communication bus (bus load) increases, re-transmission of data signals become frequent and communication may not be properly performed.

The body speed Vxa is calculated by the body electronic control unit ECB by gathering the wheel speed Vwa of each wheel at the body electronic control unit ECB. The body speed Vxa is then transmitted to the wheel electronic control unit ECW of each wheel. More specifically, the body speed Vxa is transmitted via the communication unit TSN to the wheel electronic control unit ECW. The inertia of the body (inertial mass) is relatively large. Consequently, the body speed Vxa does not rapidly change and is hardly affected by a time delay resulting from the communication cycle. In contrast, the inertia of a wheel (moment of inertia) is relatively small and rapidly changes. Consequently, a delay in the communication cycle greatly affects the execution of the wheel slip restriction control. Thus, the wheel speed Vwa is input directly to the wheel electronic control unit ECW from the wheel speed acquisition unit VWA, and the wheel electronic control unit ECW executes the wheel slip restriction control (correction of instruction pressing force FBs in anti-skid control and traction control). As a result, even when an on-board network is formed (i.e., many types of messages on communication unit TSN), the influence of information transmission delays is reduced. Further, highly responsive control is performed on the electric motor MTR, and excessive wheel slipping is restricted.

The instruction energizing amount computation block IST calculates an instruction energizing amount Ist based on the target pressing force Fbt and calculation maps CHs1 and CHs2 having preset calculation characteristics. The instruction energizing amount Ist is a target value of the energizing amount of the electric motor MTR for achieving the target pressing force Fbt. The calculation map of the instruction energizing amount Ist is formed by the calculation maps CHs1 and CHs2 for two characteristics taking into consideration the hysteresis of the braking unit BRK.

The energizing amount of the electric motor MTR is a state quantity (variable) for controlling the output torque of the electric motor MTR. The electric motor MTR outputs torque that is generally proportional to current. Thus, the current target value of the electric motor MTR may be used as the target value of energizing amount. Further, an increase in the voltage supplied to the electric motor MTR results in an increase in current. Thus, the supplied voltage value may be used as the target energizing amount. Further, the duty ratio in pulse width modulation may be used to adjust the supplied voltage value. Thus, the duty ratio may be used as the energizing amount.

The pressing force feedback control block FBC calculates a feedback energizing amount Ibt from the target pressing force Fbt (target value) and the actual pressing force Fba (actual value). More specifically, a pressing force deviation eFb, which is the deviation of the target pressing force Fbt and the actual pressing force Fba, is first calculated. A feedback energizing amount computation block IBT calculates the feedback energizing amount Ibt through PID control based on the pressing force deviation eFb. The instruction energizing amount Ist is calculated as a value corresponding to the target pressing force Fbt. However, a change in the efficiency of the braking unit BRK may result in an error between the target pressing force Fbt and the actual pressing force Fba. Thus, the feedback energizing amount Ibt is determined to decrease the error.

The target energizing amount computation block IMT calculates a target energizing amount Imt that is a final target value for the electric motor MTR. The target energizing amount computation block IMT adjusts the instruction energizing amount Ist with the feedback energizing amount Ibt and calculates the target energizing amount Imt. More specifically, the feedback energizing amount Ibt is added to the instruction energizing amount Ist to calculate the target energizing amount Imt.

The rotation direction of the electric motor MTR is determined based on the sign (positive or negative value) of the target energizing amount Imt, and the output (rotation power) of the electric motor MTR is controlled based on the level of the target energizing amount Imt. More specifically, the electric motor MTR is driven in the forward rotation direction (pressing force increasing direction) when the sign of the target energizing amount Imt is a positive sign (Imt>0), and the electric motor MTR is driven in the reverse rotation direction (pressing force decreasing direction) when the sign of the target energizing amount Imt is a negative sign (Imt<0). Further, the electric motor MTR is controlled so that the output torque increases as the absolute value of the target energizing amount Imt increases and so that the output torque decreases as the absolute value of the target energizing amount Imt decreases.

The pulse width modulation block PWM calculates an instruction value (target value) based on the target energizing amount Imt to perform pulse width modulation. More specifically, the pulse width modulation block PWM determines a duty ratio Dut of the pulse width (in cyclic pulse width, ratio of pulse width in on state relative to cycle) from the target energizing amount Imt and preset characteristics (calculation map). The pulse width modulation block PWM determines the rotation direction of the electric motor MTR based on the sign (positive sign or negative sign) of the target energizing amount Imt. For example, the rotation direction of the electric motor MTR is set so that the forward rotation direction is a value that is positive (plus) and the reverse rotation direction is a value that is negative (minus). The final output voltage is determined from the input voltage (power supply voltage) and the duty ratio Dut. Thus, the pulse width modulation block PWM determines the rotation direction of the electric motor MTR and the energizing amount of the electric motor MTR (i.e., output of electric motor MTR).

Further, the pulse width modulation block PWM may execute the so-called current feedback control. In this case, the detection value of an the energizing amount acquisition unit IMA, or the motor current Ima flowing through the electric motor MTR, is input to the pulse width modulation block PWM. The duty ratio Dut is corrected (finely adjusted) based on the deviation eIm of the target energizing amount Imt, which is the target value of the motor current, and the actual energizing amount (the motor current Ima). The current feedback control allows highly accurate motor control to be performed.

The switching control block SWT outputs the drive signals Sw1 to Sw4 to the switching elements SW1 to SW4, which configure a bridge circuit HBR, based on the duty ratio Dut (target value). Each drive signal instructs the corresponding switching element to be energized or de-energized. An increase in the duty ratio Dut prolongs the energizing time per unit time so that more current flows to the electric motor MTR.

Drive Unit DRV

The drive unit DRV is an electric circuit that drives the electric motor MTR. The drive unit DRV (drive circuit) includes the bridge circuit HBR and the energizing amount acquisition unit IMA. FIG. 2 illustrates an example of the drive unit DRV when a brush-incorporating motor (also simply referred to as brushed motor) is employed as the electric motor MTR.

The bridge circuit HBR is a circuit that allows the rotation direction (forward direction or reverse direction) of the electric motor to be controlled without the need for a bidirectional power supply by changing the energizing direction of the electric motor with a single power supply. The bridge circuit HBR includes the switching elements SW1 to SW4. The switching elements SW1 to SW4 are elements that turn on (energize) and off (de-energize) parts of an electric circuitry. The switching elements SW1 to SW4 are driven by the drive signals Sw1 to Sw4 from the wheel computer ENW. Each switching element is switched between an energized state and a de-energized state to control the rotation direction and output torque of the electric motor MTR. For example, MOS-FETs and IGBTs are used as the switching elements.

When the electric motor MTR is driven in the forward rotation direction, the switching elements SW1 and SW4 are energized (on) and the switching elements SW2 and SW3 are de-energized (off). On the other hand, when the electric motor MTR is driven in the reverse direction, the switching elements SW1 and SW4 are de-energized (off) and the switching elements SW2 and SW3 are energized (on).

The energizing amount acquisition unit IMA (e.g., current sensor) for the electric motor is arranged in the bridge circuit HBR. The energizing amount acquisition unit IMA acquires the motor current Ima, which is the energizing amount of the electric motor MTR. For example, the motor current sensor may detect the value of the current actually flowing through the electric motor MTR as the motor current Ima.

A brush-incorporating motor (also referred to as brushed motor) is employed as the electric motor MTR. The electric motor MTR includes the rotation angle acquisition unit MKA (rotation angle sensor) that acquires (detects) the rotation angle Mka (actual value) of the rotor. The rotation angle Mka is input to the wheel electronic control unit ECW.

A brushless motor may be employed instead of a brush-incorporating motor as the electric motor MTR. In the brushless motor, permanent magnets are arranged on the rotor, and the stator functions as a winding circuit (electromagnet). In the brushless motor, the rotation angle acquisition unit MKA detects the rotation angle Mka of the rotor, and the switching elements are switched in accordance with the rotation angle Mka to commutate the supplied current.

When employing a brushless motor, the bridge circuit HBR is configured by six switching elements. In the same manner as the brush-incorporating motor, the energized state and de-energized state of the switching elements are controlled in accordance with the duty ratio Dut. The six switching elements, which configure a three-phase bridge circuit, are controlled based on the actual rotation angle Mka of the rotor. The switching elements sequentially switch the direction of the energizing amount (i.e., excitation direction) for the U-phase, V-phase, and W-phase coils of the bridge circuit to drive the electric motor MTR. The rotation direction of the brushless motor (forward rotation or reverse rotation) is determined by the relationship of the rotor and the excited location.

The pressing force acquisition unit FBA acquires (detects) the actual pressing force Fba, which is the force with which the pressing member PSN presses the friction members MSB. The pressing force acquisition unit FBA is located between the threaded member NJB and the caliper CRP. For example, when the pressing force acquisition unit FBA is fixed to the caliper CRP, the pressing force acquisition unit FBA acquires the reaction (counter action) received by the pressing member PSN from the friction members MSB as the actual pressing force Fba. The actual pressing force Fba (actual value) is input to the wheel electronic control unit ECW (particularly, pressing force feedback control block FBC).

The wheel speed acquisition unit VWA (wheel speed sensor) is arranged on each wheel of the vehicle to acquire (detect) the rotation speed of the wheel and the wheel speed Vwa. More specifically, a geared sensor rotor SNR, which rotates integrally with the wheel, is arranged coaxially with the wheel. The wheel speed acquisition unit VWA is configured by a coil and a magnetic pole and arranged spaced apart by a slight gap from the outer circumference of the sensor rotor SNR. The wheel speed acquisition unit VWA detects the wheel speed Vwa, which is the rotation speed of the wheel, from changes in the magnetic flux that occurs when the sensor rotor SNR rotates. The wheel speed Vwa, which is the detection signal of the wheel speed acquisition unit VWA, is input to the wheel electronic control unit ECW (specifically, wheel slip restriction control block EWS).

A battery BAT and an alternator ALT are mounted on the body of the vehicle. The battery BAT and the alternator ALT supply the body electronic control unit ECB and the wheel electronic control unit ECW with power via a power line PWL. That is, power is supplied to the electric motor MTR by the battery BAT etc.

Anti-Skid Control Block ABS

Figure 3:
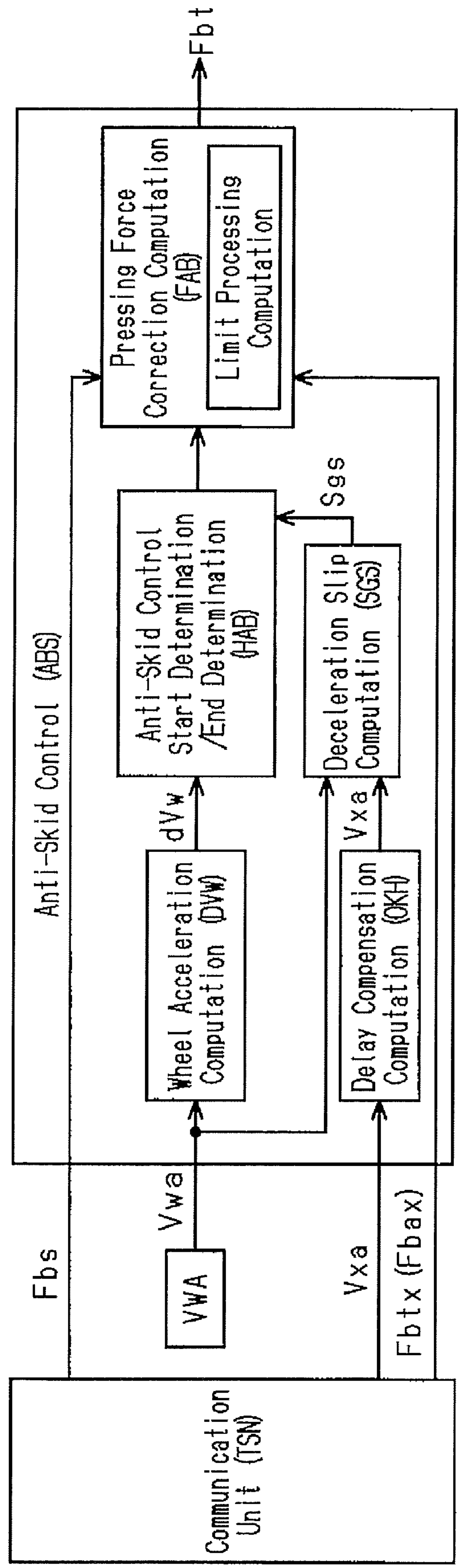
FIG. 3 is a functional block diagram illustrating an anti-skid control block of a wheel slip restriction control block of FIG. 2.

The calculation process performed in the anti-skid control block ABS of the wheel slip restriction control block EWS will now be described with reference to the functional block diagram of FIG. 3. The anti-skid control reduces deceleration slip of a wheel (i.e., locking tendency of wheel). The anti-skid control block ABS includes a wheel acceleration computation block DVW, a delay compensation computation block OKH, a deceleration slip computation block SGS, an anti-skid control start determination/end determination block HAB, and a pressing force correction computation block FAB. The wheel speed Vwa from the wheel speed acquisition unit VWA is directly input to the anti-skid control block ABS. The communication unit TSN directly inputs the instruction pressing force FBs, the target pressing force Fbtx (or actual pressing force Fbax) of another wheel, and the body speed Vxa to the anti-skid control block ABS.

The wheel acceleration computation block DVW calculates, from the wheel speed Vwa of the corresponding wheel, a wheel acceleration dVw, which is a change amount of the wheel speed Vwa over time. More specifically, the wheel acceleration dVw is calculated as a time derivative of the wheel speed Vwa.

The delay compensation computation block OKH compensates for the time delay at the communication unit TSN and calculates the compensated body speed Vxa. In the communication unit TSN, the communication cycle is known. Thus, the time delay of the body speed Vxa is compensated for based on the communication cycle to calculate the final body speed Vxa.

The deceleration slip computation block SGS calculates a deceleration slip Sgs, which is the deviation of the body speed Vxa and the wheel speed Vwa. More specifically, the deceleration slip Sgs is determined as a value obtained by subtracting the wheel speed Vwa from the body speed Vxa (Sgs=Vxa−Vwa). The deceleration slip Sgs represents the locking tendency of the wheel and is thus calculated as a positive value. When the wheel is completely locked, "Sgs=Vxa" is satisfied.

The anti-skid control start determination/end determination block HAB determines from the deceleration slip Sgs and the wheel acceleration dVw "whether or not to start the anti-skid control" and "whether or not to end the anti-skid control." More specifically, a determination to start the anti-skid control is given at the point of time when the wheel acceleration dVw becomes smaller than a predetermined value dvw1 (negative value) and the deceleration slip Sgs becomes greater than a predetermined value sgs1 (positive value). Further, a determination to end the anti-skid control is given when the body speed Vxa becomes smaller than a predetermined speed vxa1 or when the pressing force is not corrected over a predetermined time ta1 during the anti-skid control.

When the anti-skid control start determination/end determination block HAB determines to start the anti-skid control, the pressing force correction computation block FAB corrects the instruction pressing force FBs based on the deceleration slip Sgs and the wheel acceleration dVw and calculates the target pressing force Fbt. More specifically, in a calculation cycle immediately after a starting determination, the instruction pressing force FBs is decreased and corrected to reduce the deceleration slip Sgs of the wheel. In the present calculation cycle, when the deceleration slip Sgs has an increasing tendency (locking tendency), the target pressing force Fbt of the present cycle is a value decreased from the target pressing force Fbt of the preceding cycle. When the deceleration slip has a decreasing tendency (recovering tendency), the target pressing force Fbt of the present cycle is a value increased from the target pressing force Fbt of the preceding cycle. However, the target pressing force Fbt of the present cycle will never be greater than or equal to the instruction pressing force FBs. That is, the anti-skid control block ABS adjusts the instruction pressing force FBs and determines the target pressing force Fbt based on the wheel acceleration dVw and the deceleration slip Sgs so that the deceleration slip Sgs of the wheel is decreased. The instruction pressing force FBs is decreased to calculate the final target pressing force Fbt.

The inertial mass (moment of inertia in rotation direction) of the wheel is relatively small. Thus, to execute anti-skid control, it is required that the wheel speed Vwa have no time delay. Further, the wheel speed Vwa of each of the four wheels is needed to calculate the body speed Vxa. Thus, the calculation process of the anti-skid control is performed in the wheel electronic control unit ECW of each wheel based on the wheel speed Vwa directly obtained from the wheel speed acquisition unit VWA and the body speed Vxa transmitted from the communication unit TSN. The inertial mass of the body is relatively large and does not suddenly change. Thus, even when the body speed Vxa is acquired via the communication unit TSN, the influence of a time delay resulting from communication is marginal. In the above configuration, the calculation process of the anti-skid control and the like is performed with high accuracy and locking of the wheel (excessive deceleration slip) is reduced in a preferred manner.

Further, the pressing force correction computation block FAB may include a limit processing computation block. The limit processing computation block adjusts the control state of the corresponding wheel based on the control state (Fbtx, Fbax, etc.) of another wheel undergoing the anti-skid control. The other wheel is the wheel located sideways from the corresponding wheel with respect to the traveling direction of the vehicle. For example, when the corresponding wheel is the rear right wheel, the other wheel is the rear left wheel. The control state of the other wheel is at least one of "a determination result to start the anti-skid control", "the target pressing force Fbt that has been corrected by the anti-skid control", and "the actual pressing force Fba". The instruction pressing force FBs of the corresponding wheel is limited and the target pressing force Fbt is calculated based on the control state (Fbtx, Fbax, etc.) of the other wheel.

Limit Processing Computation Block in Pressing Force Correction Computation Block FAB The limit processing calculation in the pressing force correction computation block FAB of the anti-skid control block ABS will now be described with reference to the chronological line charts of FIGS. 4 and 5. The limit processing calculation includes a calculation process for a front wheel braking unit and a calculation process for a rear wheel braking unit.

Limit Processing Calculation for Front Wheel Braking Unit

First, the limit calculation process of the braking unit BRK for a front wheel will be described with reference to the chronological line charts of FIGS. 4A and 4B. At time t0, the driver starts sudden braking. As the operation amount Bpa increases, the instruction pressing force FBs for the braking units BRK of the two front wheels is increased at an increasing gradient kf0 (amount of change per unit time). At time t1, the wheel electronic control unit ECW of one of the left and right front wheels (corresponding wheel, for example, right front wheel) is provided with the anti-skid control state (also simply referred to as the control state) of the other one of the left and right front wheels (e.g., left front wheel). At least one of "a determination result to start the anti-skid control", "the target pressing force Fbt that has been corrected by the anti-skid control", and "the actual pressing force Fba" of the other wheel is transmitted as the control state. For example, when the other wheel is the left front wheel, the control state is transmitted from the wheel electronic control unit ECW of the left front wheel via the communication unit TSN to the electronic control unit ECW of the right front wheel. When the wheel electronic control unit ECW of one of the front wheels (e.g., wheel electronic control unit ECW of right front wheel) receives information of the control state (starting determination result etc.) of the other front wheel (among the left and right front wheels, the front wheel located at opposite side in sideward direction of vehicle, for example, left front wheel), the increasing gradient of the instruction pressing force FBs is limited to the predetermined value kf1 (<kf0) and the target pressing force Fbt is calculated.

When the vehicle is traveling along a road where the road friction coefficient differs between the left and right sides (i.e., split-p road), sudden braking may result in the execution of anti-skid control on only the left wheels or only the right wheels (e.g., front left wheel). This will produce a braking force difference between the left and right wheels and deflect the vehicle. Nevertheless, the control state (Fbtx, Fbax, etc.) of the front wheel on which the anti-skid control has started is transmitted to the wheel electronic control unit ECW of the front wheel located at the opposite side in the sideward direction of the vehicle. This will correct the instruction pressing force FBs of that wheel. More specifically, the time change amount when the instruction pressing force FBs increases is limited by the predetermined value kf1. This limits sudden increases in the difference of braking force between the left and right front wheels and maintains a state that allows the driver to easily control the vehicle behavior by performing steering operations.

Limit Processing Calculation for Rear Wheel Braking Unit

First, the limit calculation process of the braking unit BRK for a rear wheel will be described with reference to the chronological line charts of FIGS. 5A and 5B. At time t0, the driver starts sudden braking. As the operation amount Bpa increases, the instruction pressing force FBs for the braking units BRK of the two rear wheels is increased. At time t1, the wheel electronic control unit ECW of one of the left and right rear wheels (corresponding wheel, for example, right rear wheel) is provided with the anti-skid control state (also simply referred to as the control state) of the other one of the left and right rear wheels (e.g., left rear wheel). At least one of "a determination result to start the anti-skid control", "the target pressing force Fbt that has been corrected by the anti-skid control", and "the actual pressing force Fba" of the other wheel is transmitted as the control state. For example, when the other wheel is the left rear wheel, the control state is transmitted from the wheel electronic control unit ECW of the left rear wheel via the communication unit TSN to the electronic control unit ECW of the right rear wheel. When the wheel electronic control unit ECW of one of the rear wheels receives the control state of the other rear wheel (among the left and right rear wheels, the rear wheel located at opposite side in sideward direction of vehicle), an increase in the instruction pressing force FBs is limited and the target pressing force Fbt is calculated. More specifically, the target pressing force Fbt for one side is corrected to match the target pressing force Fbtx (or actual pressing force Fbax) of the other side. As shown by the double-dashed line in FIG. 5A, the target pressing force Fbt may be limited (held) to the value at the point of time in which a determination result to start the anti-skid control was received.

For the front wheels, the limit processing calculation limits the increasing gradient. For the rear wheels, the limit processing calculations matches the target pressing force Fbt of the left wheel with that of the right wheel. This prevents the generation of a yawing moment resulting from the difference in brake force between the left and right rear wheels, ensures the lateral force of the rear wheels, and maintains the vehicle stability.

Traction Control Block TCS

Figure 6:
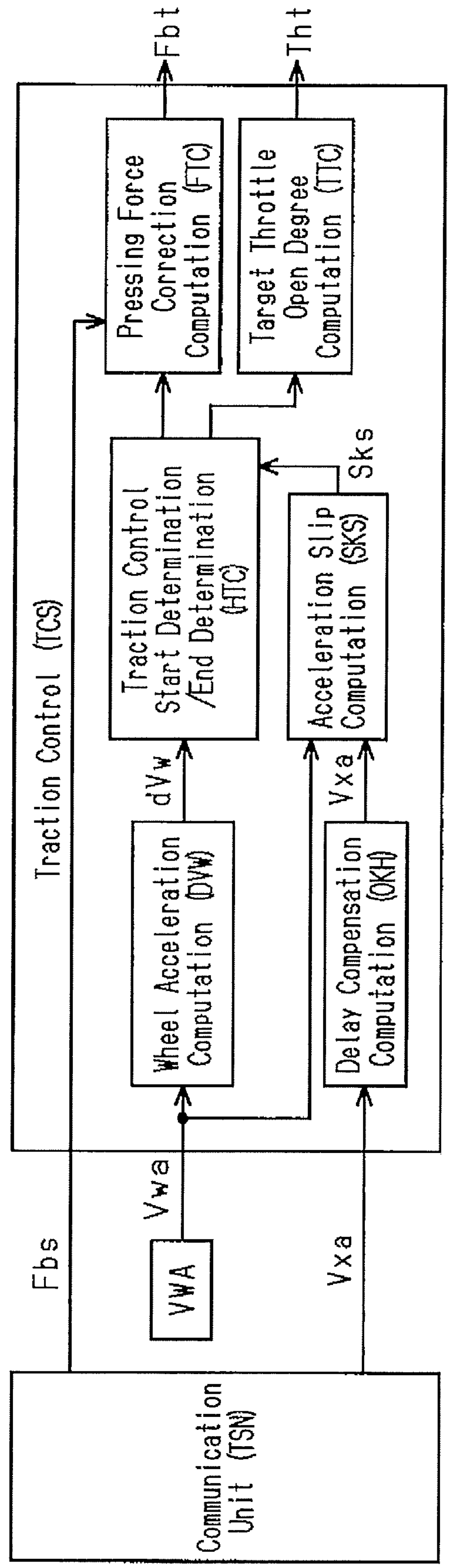
FIG. 6 is a functional block diagram illustration a traction control block of the wheel slip restriction control block.

The calculation performed by the traction control block TCS of the wheel slip restriction control block EWS will now be described with reference to the functional block diagram of FIG. 6. The traction control reduces wheel acceleration slip (i.e., wheel spinning tendency). Reference characters that are the same as those of the anti-skid control block ABS represent the same function and will not be described.

The traction control block TCS includes the wheel acceleration computation block DVW, the delay compensation computation block OKH, an acceleration slip computation block SKS, a traction control start determination/end determination block HTC, a target throttle open degree computation block TTC, and a pressing force correction computation block FTC. The wheel speed acquisition unit VWA directly inputs the wheel speed Vwa to the traction control block TCS. The communication unit TSN inputs the instruction pressing force FBs and the body speed Vxa to the traction control block TCS.

The acceleration slip computation block SKS calculates an acceleration slip Sks, which is the deviation of the body speed Vxa and the wheel speed Vwa. More specifically, the acceleration slip Sks is determined as a value obtained by subtracting the body speed Vxa from the wheel speed Vwa (Sks=Vwa−Vxa). The acceleration slip Sks represents the wheel spinning tendency (excessive rotation) and is thus calculated as a positive value.

The traction control start determination/end determination block HTC determines from the acceleration slip Sks and the wheel acceleration dVw "whether or not to start traction control" and "whether or not to end traction control." More specifically, the starting of traction control is determined at the point of time in which the wheel acceleration dVw becomes greater than a predetermined value dvw2 (positive value) and the acceleration slip Sks becomes greater than a predetermined value sks1 (positive value).

The target throttle open degree computation block TTC receives the start determination result of the traction control and calculates the target throttle open degree Tht. More specifically, the target throttle open degree Tht is determined based on the acceleration slip Sks and the wheel acceleration dVw.

The pressing force correction computation block FTC adjusts the instruction pressing force FBs and determines the target pressing force Fbt to decrease the acceleration slip Sks of the wheel based on the wheel acceleration dVw and the acceleration slip Sks in accordance with the traction control start determination from the traction control start determination/end determination block HTC. That is, the instruction pressing force FBs (Fbs=0 because vehicle is accelerating) is increased and the final target pressing force Fbt is calculated to avoid the spinning tendency of the wheel.

The wheel speed Vwa, which is prone to be affected by a time delay resulting from the communication cycle is directly input to the wheel electronic control unit ECW. To calculate the body speed Vxa, the wheel speed Vwa of each of the four wheels is needed. Thus, the wheel speed Vwa of each of the four wheels is gathered at the body electronic control unit ECB. Further, the body speed Vxa is transmitted via the communication unit TSN to the wheel electronic control unit ECW. The wheel electronic control unit ECW executes traction control based on the body speed Vxa and the wheel speed Vwa. Such a configuration obtains advantages similar to those of the anti-skid control.

The electric braking device EBR including the braking unit BRK for each of the four wheels has been described above. However, there is no limit to such a configuration and a typical hydraulic braking unit may be employed for the front wheels in lieu of the electric braking unit BRK (i.e., configuration in which hydraulic braking units is used for the front wheels and electric braking units is used for the rear wheels). In this configuration, the wheel speed Vwa that is a signal of the wheel speed acquisition unit VWA of the front wheel is directly input to the body electronic control unit ECB, whereas the wheel speed Vwa that is a signal of the wheel speed acquisition unit VWA of the rear wheel is directly input to the wheel electronic control unit ECW. Conversely, the electric braking unit BRK may be employed for the front wheels, and hydraulic braking units may be employed for the rear wheels. In this configuration, the wheel speed Vwa that is a signal of the wheel speed acquisition unit VWA of the rear wheel is directly input to the body electronic control unit ECB, whereas the wheel speed Vwa that is a signal of the wheel speed acquisition unit VWA of the front wheel is directly input to the wheel electronic control unit ECW.

Operation and Advantages

The operation and advantages of the vehicle electric braking device EBR in accordance with the first embodiment will now be discussed.

The body speed Vxa is needed to execute wheel slip restriction control (anti-skid control etc.) that restricts wheel slip. More specifically, braking torque adjustment is performed by comparing the body speed Vxa and the wheel speed Vwa. The body speed Vxa is calculated from the four wheel speeds Vwa obtained at the front and rear left and right sides of the vehicle. Thus, the wheel speed Vwa of the four wheels is transmitted to the body electronic control unit ECB, and the body speed Vxa is calculated by the body electronic control unit ECB.

In a hypothetical configuration, the wheel speed acquisition unit VWA (wheel speed sensor) is connected to the wheel electronic control unit ECW, the wheel electronic control unit ECW transmits the wheel speed Vwa to the body electronic control unit ECB, the body electronic control unit ECB calculates the body speed Vxa and executes the wheel slip restriction control (control algorithm), and the target pressing force Fbt of each wheel is transmitted to the wheel electronic control unit ECW. In this configuration, the wheel speed Vwa is transmitted via the communication line SGL from the wheel electronic control unit ECW to the body electronic control unit ECB and the target pressing force Fbt is transmitted via the communication line SGL from the body electronic control unit ECB to the wheel electronic control unit ECW to adjust the braking torque. When a vast amount of information is received and transmitted through the single communication line SGL (serial communication bus), the capacity imposes limitations on the communication cycle. More specifically, there is an upper limit to the amount of information that is received and transmitted. Thus, a delay in the communication cycle of the communication unit TSN (i.e., communication line SGL) affects adjustment of the braking torque. Accordingly, it becomes difficult to properly execute wheel slip restriction control that requires the calculation cycle to be a short time.

In the embodiment described above, the wheel electronic control unit ECW executes the wheel slip restriction control based on the wheel speed Vwa, which is directly input from the wheel speed acquisition unit VWA, and the body speed Vxa, which is transmitted via the single communication line SGL from the body electronic control unit ECB. This is because "the inertia of a wheel (moment of inertia) is relatively small and thus prone to be affected by a time delay resulting from the communication cycle but the inertia of the vehicle body (inertial mass) is relatively large compared to the inertial of the wheel and thus hardly affected by a time delay resulting from the communication cycle. The configuration described above simplifies the wiring (cable) between the body electronic control unit ECB and the wheel electronic control unit ECW, eliminates the effect of communication delays, and allows for proper execution of the wheel slip restriction control.

A second embodiment of the vehicle electric braking device EBR will now be described with reference to FIG. 7. The vehicle electric braking device EBR of the present embodiment differs from the first embodiment in that automatic braking is performed so that the vehicle avoids collision with an obstacle (another vehicle, guardrail, or pedestrian) located in front of the vehicle. Accordingly, in the description hereafter, same reference numerals are given to those components that are the same as the corresponding components of the first embodiment. Such components will not be described in detail.

Figure 7:
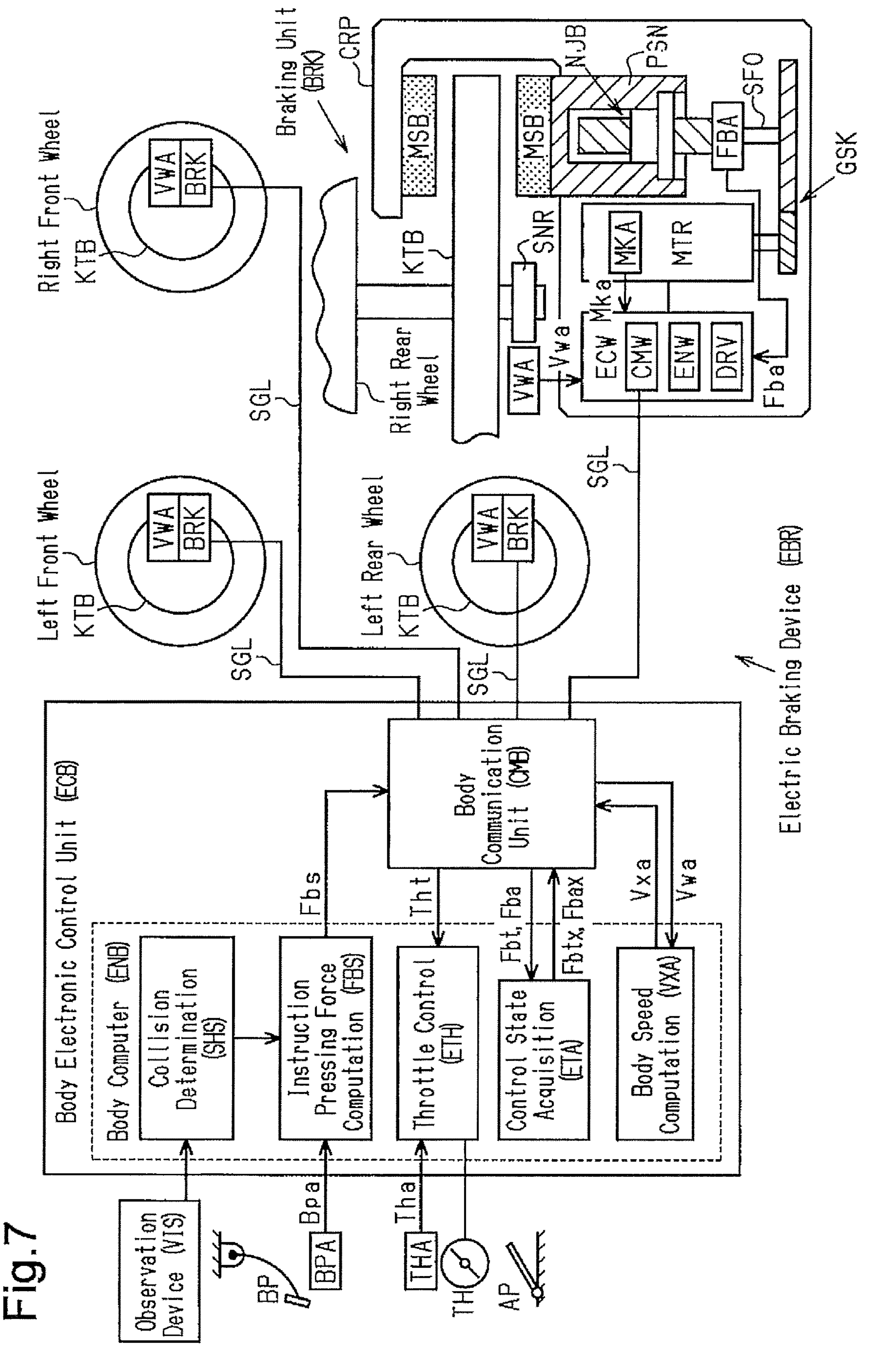
FIG. 7 is a diagram showing the entire configuration of a vehicle electric braking device in accordance with a second embodiment of the present invention.

As shown in FIG. 7, a vehicle including the vehicle electric braking device EBR of the present embodiment is provided with an observation device VIS that detects an obstacle located in front of the vehicle. The observation device VIS includes, for example, at least one of an image capturing unit, such as a monitoring camera, and millimeter wave radar. The observation device VIS detects whether or not an obstacle exists in front of the vehicle, the distance from the vehicle to the obstacle, and the relative speed of the vehicle with respect to the obstacle. The various types of information detected by the observation device VIS is input to the body computer ENB of the body electronic control unit ECB.

Body Electronic Control Unit ECB

In addition to the instruction pressing force computation block FBS, the body speed computation block VXA, the throttle control block ETH, and the control state acquisition block ETA, the body computer ENB of the body electronic control unit ECB includes a collision determination block SHS. The collision determination block SHS determines the probability of the vehicle colliding with an obstacle through a known process based on the information received from the observation device VIS. When determining that there is probability of collision, the determination is input to the instruction pressing force computation block FBS.

When the instruction pressing force computation block FBS does not receive a determination of the probability of the vehicle colliding with an obstacle, the instruction pressing force computation block FBS calculates the instruction pressing force FBs based on the operation amount Bpa from the brake operation amount acquisition unit BPA and outputs the instruction pressing force FBs to the body communication unit CMB. When receiving a determination of the probability of the vehicle colliding with an obstacle, the instruction pressing force FBs is calculated based on, for example, the distance from the vehicle to the obstacle, the relative speed, the deceleration of the vehicle, and the like. More specifically, the instruction pressing force FBs is set to a larger value as the distance to the obstacle from the vehicle decreases. Further, the instruction pressing force FBs is set to a larger value as the relative speed increases. The calculated instruction pressing force FBs is output to the body communication unit CMB.

Operation and Advantages

The operation and advantages of the vehicle electric braking device EBR in accordance with the second embodiment will now be described.

Even in a case in which automatic braking is performed to avoid collision of the vehicle with an obstacle, anti-skid control, which is one example of slip restriction control, may be started when there is an increase in the deceleration slip Sgs calculated by the wheel electronic control unit ECW. Even in such a case, the wheel electronic control unit ECW corrects the instruction pressing force FBs, which is received from the body electronic control unit ECB via the communication line SGL, based on the deceleration slip Sgs, which has been calculated by the wheel electronic control unit ECW. The output of the electric motor MTR is adjusted based on the corrected instruction pressing force FBs. Accordingly, even during automatic braking, the effect of a communication delay is eliminated, and anti-skid control is properly executed.

The invention claimed is:

1. A vehicle electric braking device that applies braking torque to a wheel of a vehicle by pushing a friction member against a rotation member in accordance with an output of an electric motor without employing hydraulic pressure when a driver of the vehicle operates a brake operation member, the vehicle electric braking device comprising:

a body electronic control unit arranged at a location on a body of the vehicle and configured to calculate an instruction value of the output of the electric motor based on an operation amount of the brake operation member;

a wheel electronic control unit, which is structurally distinct from the body electronic control unit, arranged proximate to the wheel of the vehicle at a location different from the location on the body of the vehicle and configured to adjust the output of the electric motor based on the instruction value;

a communication line connected to both of the body electronic control unit and the wheel electronic control unit to perform signal transmission between the body electronic control unit and the wheel electronic control unit; and a wheel speed sensor connected to the wheel electronic control unit to acquire a speed of the wheel as a wheel speed, wherein the body electronic control unit is configured to calculate a body speed of the vehicle based on the wheel speed that is transmitted from the wheel electronic control unit via the communication line, and the wheel electronic control unit is configured to adjust the output of the electric motor so as to limit an increase in slip of the wheel based on the body speed transmitted from the body electronic control unit via the communication line and the wheel speed acquired by the wheel speed sensor.

2. The vehicle electric braking device according to claim 1, wherein the wheel electronic control unit is configured to correct the instruction value so as to decrease a deceleration slip of the wheel based on deviation of the body speed and the wheel speed and adjust the output of the electric motor based on the corrected instruction value.

3. The vehicle electric braking device according to claim 1, wherein the wheel electronic control unit is configured to correct the instruction value so as to decrease an acceleration slip based on a deviation of the body speed and the wheel speed and adjust the output of the electric motor based on the corrected instruction value.

4. A vehicle electric braking device that applies braking torque to a wheel of a vehicle by pushing a friction member against a rotation member in accordance with an output of an electric motor without employing hydraulic pressure when automatic braking is being performed while the vehicle is traveling, the vehicle electric braking device comprising:

a body electronic control unit arranged at a location on a body of the vehicle and configured to calculate an instruction value of the output of the electric motor based on a distance from the vehicle to an obstacle located in front of the vehicle;

a wheel electronic control unit, which is structurally distinct from the body electronic control unit, arranged proximate to the wheel of the vehicle at a location different from the location on the body of the vehicle and configured to adjust the output of the motor based on the instruction value;

a communication line connected to both of the body electronic control unit and the wheel electronic control unit to perform signal transmission between the body electronic control unit and the wheel electronic control unit; and a wheel speed sensor connected to the wheel electronic control unit to acquire a speed of the wheel as a wheel speed, wherein the body electronic control unit is configured to calculate a body speed of the vehicle based on the wheel speed that is transmitted from the wheel electronic control unit via the communication line, and the wheel electronic control unit is configured to adjust the output of the electric motor so as to limit an increase in slip of the wheel based on the body speed transmitted from the body electronic control unit via the communication line and the wheel speed acquired by the wheel speed sensor.

5. A vehicle electric braking device that applies braking torque to a wheel of a vehicle by pushing a friction member against a rotation member in accordance with an output of an electric motor without employing hydraulic pressure, the vehicle electric braking device comprising:

a body electronic control unit arranged at a location on a body of the vehicle and configured to calculate an instruction value of the output of the electric motor;

a wheel electronic control unit, which is structurally distinct from the body electronic control unit, arranged proximate to the wheel of the vehicle at a location different from the location on the body of the vehicle and configured to adjust the output of the electric motor based on the instruction value;

a communication line connected to both of the body electronic control unit and the wheel electronic control unit to perform signal transmission between the body electronic control unit and the wheel electronic control unit; and a wheel speed sensor connected to the wheel electronic control unit to acquire a speed of the wheel as a wheel speed, wherein the body electronic control unit is configured to calculate a body speed of the vehicle based on the wheel speed that is transmitted from the wheel electronic control unit via the communication line, and the wheel electronic control unit is configured to adjust the output of the electric motor so as to limit an increase in slip of the wheel based on the body speed transmitted from the body electronic control unit via the communication line and the wheel speed acquired by the wheel speed sensor.

* * * * *